United States Patent
Spedden et al.

[15] 3,639,003
[45] Feb. 1, 1972

[54] PROCESS FOR LEACHING METAL VALUES FROM MINERAL-BEARING EARTH MATERIAL

[72] Inventors: Henry Rush Spedden; Emil Edward Malouf, both of Salt Lake City, Utah

[73] Assignee: Kennecott Copper Corporation, New York, N.Y.

[22] Filed: Aug. 22, 1969

[21] Appl. No.: 852,373

[52] U.S. Cl. ...................................299/5, 23/104, 299/9, 299/17
[51] Int. Cl. .........................................................E21b 43/28
[58] Field of Search .....................299/4, 5, 9; 75/101, 104

[56] References Cited

UNITED STATES PATENTS

| | | | |
|---|---|---|---|
| 1,908,876 | 5/1933 | Van Meter | 299/5 |
| 2,251,916 | 8/1941 | Cross | 299/5 |
| 3,132,852 | 5/1964 | Dolbear | 299/5 |
| 3,260,593 | 7/1966 | Zimmerley et al. | 75/104 X |

*Primary Examiner*—Ernest R. Purser
*Attorney*—John L. Sniado, Mallinckrodt and Mallinckrodt, P. H. Mallinckrodt and Philip A. Mallinckrodt

[57] ABSTRACT

A high-pressure stream of leach solution from, for example, a hydraulic monitor, is directed against a mine waste dump or other mass of mineral-bearing material to be leached, for the purpose of dislodging and breaking up the material, while, at the same time, leaching metallic values therefrom. It is preferred that material dislodged by the pressurized leach solution be formed into piles and that other high-pressure streams of leach solution be used to further agitate the piled material and to complete the leaching of metallic values therefrom.

8 Claims, 2 Drawing Figures

PATENTED FEB 1 1972

3,639,003

INVENTORS
HENRY RUSH SPEDDEN
EMIL EDWARD MALOUF
BY
*Mallinckrodt and*
*Mallinckrodt*
ATTORNEYS

3,639,003

PROCESS FOR LEACHING METAL VALUES FROM MINERAL-BEARING EARTH MATERIAL

BACKGROUND OF THE INVENTION

1. Field

This invention relates to the leaching of metallic values from masses of materials containing same, especially mine waste dumps of consolidated, substantially impervious character.

2. State of the Art

Extensive waste dumps are built up at mines, for example at open pit copper mines from the overburden which is removed to expose and provide access to the ore itself. The waste material usually contains very small quantities of metallic values, which can be economically recovered only by a leaching procedure carried out in place.

Leaching is normally effected by pumping acidified water to the top of the dump and letting it percolate down through the interstices of the mass of material and collecting it at the base of the dump, usually for recycling until a sufficient concentration of dissolved copper values has built up therein to warrant stripping of the pregnant solution, as by cementation on metallic iron. Examples of this procedure are found in U.S. Pat. Nos. 2,563,623 and 2,829,964. Difficulties with permeability of such dumps, due to the buildup of precipitated iron salts in the interstices, have been experienced and have heretofore been resolved by certain controls applied to the leaching solution, see Zimmerley et al. U.S. Pat. No. 3,330,650.

The material deposited in dumps may vary from pieces 6 inches in diameter and above down to very fine particles. Although discrete in character when dumped, exposure to the water, oxygen, and bacteria produces chemical reactions and heat which promote disintegration or decrepitation of the larger pieces of material into particulate size. Over a period of time, ranging from a few weeks to many years depending on the composition of the material, the mass may and often does become of claylike consistency. Large portions thereof are compressed into a hard material which is virtually impervious to the flow of liquids.

Attempts to percolate leach solutions through such dumps have met with little success. The solution penetrates a short distance into the top of the dump and then forms pools on the surface that remain for long periods subject to evaporation. One method of overcoming the pooling effect has been proposed in U.S. Pat. No. 3,441,316 and involves the drilling of wellholes into the surface of the mine dump and the injection of the leach solution therethrough. However, this does not solve the fundamental problem of the imperviousness of the mass in general. Moreover, in many instances the terrain on which the material has been dumped is so flat that whatever leach solution ultimately reaches the bottom cannot flow from the dump and is difficult if not impossible to collect for stripping of its metallic content. Although these problems have been particularly recognized with waste dumps of open pit copper mines, there are a variety of other situations presenting generally similar problems. No effective way has yet been found for treating such masses of material.

Objectives

In the making of the invention it was a principal object to provide for the effective leaching of mine dumps and other masses of metal-value-containing material, such as deposits of mill tailing, without concern for conditions of impermeability which ordinarily present major problems. Other objects were to effect rapid and thorough extraction of metallic values from mine waste dumps and the like economically, to break up consolidated and hardened portions of mine waste dumps and the like while contacting the metallic values with leach solution, and to make recovery of the pregnant leach solution easy regardless of the terrain.

SUMMARY OF THE INVENTION

According to the invention, a high-pressure stream of leach solution, supplied for example by a hydraulic monitor, is directed against the dump or other mass of material to be leached with sufficient force to loosen and dislodge material from the mass, while at the same time agitating and breaking up hardened, consolidated material into relatively small pieces or particles. The leach solution thereby comes into close contact with the material and is able to efficiently carry out its leaching function. The pregnant leach solution is collected in a settling pond or sump in customary manner for either recycling through the monitor or delivery to the usual stripping stage, e.g., a cementation procedure, to recover the metal values from solution.

In preferred embodiment, a hydraulic monitor is employed to direct a pressurized stream of leach solution against a face of the mass to dislodge material therefrom and to form one or more piles of the dislodged material, while other monitors are used to discharge pressurized leach solution into the pile or piles for agitating and further leaching the metal-bearing material.

THE DRAWING:

The best mode presently contemplated of carrying out the invention is illustrated in the attached drawing, wherein:

FIG. 1 is a pictorial view showing the use of a single hydraulic monitor directed against a face of a mine dump or other mass of material to be leached, with the metal-bearing solutions accumulating in settling basins;

FIG. 2, a similar view showing additional hydraulic monitors agitating and further leaching a pile of material resulting from initially dislodging material from the face of a mine dump or other mass of material by use of a single hydraulic monitor, and the metal-bearing solutions accumulating in settling basins.

DETAILED DESCRIPTION OF THE ILLUSTRATED EMBODIMENTS

As illustrated, the high-pressure streams utilized in the process of the invention are obtained by passing a leach solution from any suitable source (not shown) or from a recycling reservoir (not shown) through conventional hydraulic monitors. The streams are directed against the material to be leached so as to wash loose discrete particles of the material from hard consolidated portions of the mass and so as to disintegrate such consolidated portions and expose entrapped and absorbed values to the leaching action of the solution.

Figure 1:
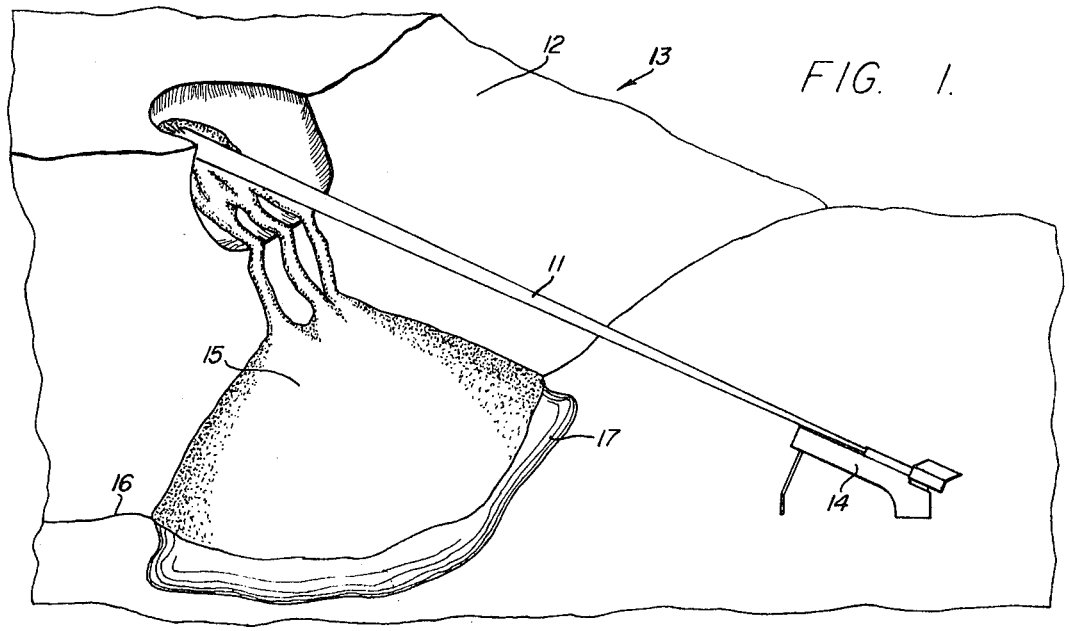

In FIG. 1, a high-pressure stream 11, of leach solution is directed against a face 12 of a mass of material 13, such as a mine waste dump, by means of a conventional hydraulic monitor 14. The force of the stream dislodges and disintegrates massed material contacted by it and washes such material into a pervious pile 15 at the base 16 of the mass 13, through which pile the solution freely flows. The material is afforded maximum exposure to the leach solution as it is disintegrated, agitated, and permeated by the solution, resulting in maximum extraction of values.

The leach solution 17 pregnant with metallic values is collected in any suitable manner, as in a sump or reservoir at the base 16 of the deposit, and can be settled or filtered to remove any residual particulate matter. Depending upon the particular circumstances, it will either be stripped of its contained values following a single pass through the material, or will be recycled through the monitor or pumped to the top of the previous pile 15 for gravity flow therethrough to increase the concentration of values therein before being subjected to the stripping operation.

Figure 2:
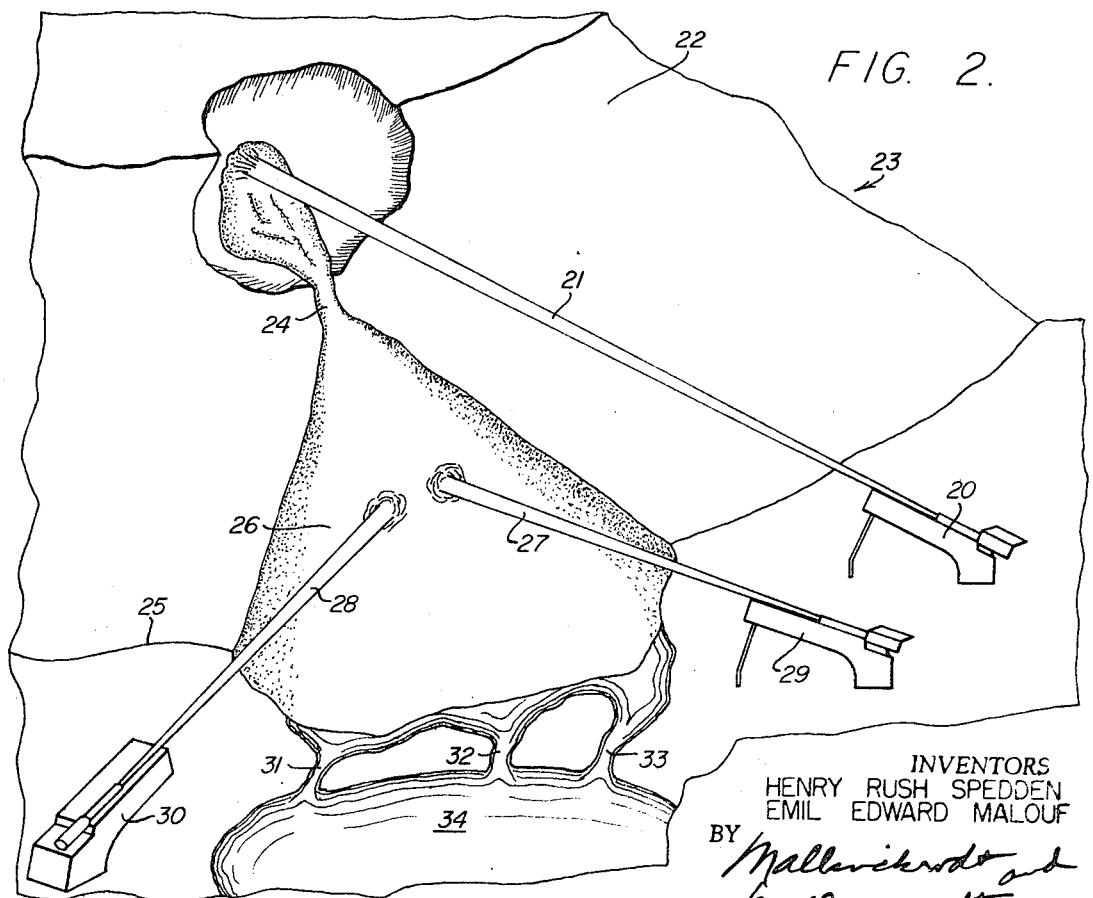

In some instances, greater efficiency can be achieved if several hydraulic monitors are employed in the process. Thus, as shown in FIG. 2, a single monitor 20 is employed to project a high pressure stream 21 of leach solution against a face 22 of a dump or other mass of material 23, thereby breaking and dislodging material and causing the resulting rubble to flow down with the solution, as at 24, to the base 25 of the deposit to form a pile 26. The material is further agitated and disintegrated by high-pressure streams 27 and 28 from additional hydraulic monitors 28 and 29, respectively, directed into the pile 26. As illustrated, the pregnant solution flows into channels 31, 32, and 33 at the base of the dump, and from there into one or more collecting and settling basins 34, wherein any fine particulate matter accompanying the pregnant solution settles out. The clarified solution can be stripped of the metal-bearing values or recycled as previously indicated to further increase the concentration of values in the pregnant solution.

In some instances, material dislodged from the face of a dump or mass of material susceptible to leaching may not naturally build up into a pile as indicated in the drawings. In such instances, the coarse material, from which the "fines" have been washed, can be stockpiled by conveyor belt or truck to build permeable leach piles for continued leaching. In this connection, it should be noted that leaching of the metal values from the "fines" or small particles of the dump material is completed rapidly and that ion exchange of the metal values by the hydrogen ions in the leach solution occurs with the claylike portion of the dump material releasing the metal values to solution. The coarse fraction of the dump material, with the "fines" and claylike material removed, can then be stockpiled for conventional leaching.

In all instances, the leach solution is employed not only to dislodge, agitate, and move the material, but also to simultaneously leach the values therefrom.

It is important that the pressurized stream of leach Nev., have sufficient force to dislodge and break away material from the dump in discrete pieces and to disintegrate the larger pieces into smaller pieces or particles. The effect of the leach stream should not be merely a washing action. The force necessary to accomplish this will vary, depending on the nature of the material to be leached. It is quite apparent that greater force will be necessary if the material has hardened into a compacted mass by the action of clays and various salts. For the waste dump of the low-grade, open-pit, copper mine of Kennecott Copper Corporation at Ruth, Nev., which contains values in the form of mined copper oxide and sulfide minerals and has been building up over 60 years, it was found that a pressure of 250 pounds per square inch is necessary to effectively dislodge the material from a face of the dump by means of a hydraulic monitor having a discharge nozzle orifice 1 inch in diameter. Other masses of material not so well consolidated or of different character, such as deposits of mill tailings, require less pressure. In some instances, a pressure as low as 50 p.s.i. will suffice to carry out an effective leaching operation.

In the practice of the method it has been found that, for best results, the leach solution should be on the strongly acidic side, that is to say it should have an acid strength near, at, or somewhat above the upper range customarily employed in leaching. Thus, in the leaching of mixed copper sulfides and oxides, such as are present in the waste dumps at Ruth, Nev., best results are obtained when the pH of the sulfuric acid, ferric sulfate leach solution is at or below 1.7 and preferably between pH 1.5 and 1.7. At a pH above 1.7, smaller amounts of copper are solubilized, making the process less economical.

Although the process will probably be used most extensively in connection with the leaching of waste dumps of open-pit copper mines and, to a lesser extent, with deposits of mill tailings from the flotation mills associated with such mines, the process is also applicable to the recovery of other metallic values, such as aluminum, iron, nickel, uranium, etc., by leaching. In these instances, leach solutions appropriate for the solubilization of the particular metallic values concerned will be used. Also, although the process is particularly useful in connection with the leaching of waste dumps and other masses of metal-bearing materials that have become impervious, as by consolidation and hardening of the otherwise discrete material, it is also useful as a substitute for ordinary low-pressure or gravity flow leaching procedures under certain circumstances, depending upon economics in any particular instance.

EXAMPLE

In attempting to leach copper values from a copper mine waste dump using well-known leaching techniques, it was found that the waste material had deteriorated into the form of a consolidated claylike substance which had become hard and resistant to flow of the leach solution therethrough. The permeability was so low that the leach solution penetrated the material at a rate of only approximately 1 foot per day. Even the use of injection drill holes extending into the dump from a pond containing leach solution on top of the dump was ineffective. An additional complicating factor was the fact that the dump was situated on flat terrain, which prevented the small amounts of leach solution which has slowly made their way down through the dump from flowing out from under the dump for recovery and stripping of their metal content.

The process of the invention was then utilized, employing the same acidic ferric sulfate leach solution, but at a pH of 1.6 rather than the usual 1.9 to 2.1. This leach solution was passed through a hydraulic monitor at a pressure of 250 p.s.i. and a feed rate of 450 gals./minute, and the resulting high-pressure stream of leach solution was directed against a face of the dump containing highly oxidized and altered cooper-bearing material. This resulted in a concentration of copper values in the pregnant leach solution, caught in a rough earth reservoir at the base of the dump, corresponding to about 1 pound of copper per ton of material subjected to the leaching action of the solution. As the operation exposed in the interior of the dump, the concentration of copper values in the pregnant leach solution increased to about 2 pounds of copper per ton of material leached. At this concentration, approximately 8 pounds of acid were consumed for each pound of copper recovered. It was determined that between 50 and 80 percent of the copper in the material could be economically recovered by use of the process of the invention.

We claim:

1. A process for leaching metallic values from a mass of metallic mineral-bearing and water-insoluble earth material, comprising
   directing a high-pressure stream of leach solution for the metallic values concerned against a face of the mass of mineral-bearing material to simultaneously dislodge said material from the mass, agitate it, and leach metallic values therefrom; and
   separating the pregnant leach solution from the leached material.

2. A process as set forth in claim 1, wherein the pregnant leach solution is recycled through the process until a predetermined concentration of metal values is present in the leach solution.

3. A process as set forth in claim 1, wherein the pregnant leach solution is processed to remove the metal values from the solution.

4. A process as set forth in claim 1, wherein the mass of earth material contains copper minerals, the leach solution is an acidic ferric sulfate solution, and the metal values leached from said minerals are copper values.

5. A process as set forth in claim 4, wherein the leach solution has a pH of at most pH 1.7.

6. A process as set forth in claim 4, wherein the body of mineral-bearing material is a mine waste dump.

7. A process as set forth in claim 1, wherein at least one stream of leach solution under pressure is directed against the face of the mass to dislodge the mineral-bearing material from the mass, and at least one additional stream of leach solution is directed into the dislodged material to agitate the material in the presence of leach solution and to solubilize the metallic values contained in the material.

8. A process of leaching metallic values from metallic mineral-bearing and water-insoluble earth material comprising
directing high-pressure stream of leach solution for the metallic values concerned against a face of the mass of mineral-bearing material to dislodge said material from the mass;
stockpiling said dislodged material; and
leaching said stockpiled material.

* * * * *